(12) United States Patent
Park et al.

(10) Patent No.: US 8,753,533 B2
(45) Date of Patent: Jun. 17, 2014

(54) MIXED CATHODE ACTIVE MATERIAL HAVING IMPROVED POWER CHARACTERISTICS AND LITHIUM SECONDARY BATTERY INCLUDING THE SAME

(75) Inventors: Jung Hwan Park, Daejeon (KR); Song Taek Oh, Daejeon (KR); Geun Chang Chung, Daejeon (KR); Su Hwan Kim, Daejeon (KR); Juichi Arai, Seoul (KR)

(73) Assignee: LG Chem, Ltd., Seoul (KR)

(*) Notice: Subject to any disclaimer, the term of this patent is extended or adjusted under 35 U.S.C. 154(b) by 0 days.

(21) Appl. No.: 13/467,697

(22) Filed: May 9, 2012

(65) Prior Publication Data

US 2012/0217452 A1    Aug. 30, 2012

Related U.S. Application Data

(63) Continuation of application No. PCT/KR2012/000969, filed on Feb. 9, 2012.

(30) Foreign Application Priority Data

Feb. 9, 2011    (KR) .................. 10-2011-0011448

(51) Int. Cl.
*H01M 4/88*    (2006.01)

(52) U.S. Cl.
USPC ........ 252/182.1; 252/506; 429/128; 429/149; 429/217; 429/224; 429/231.95

(58) Field of Classification Search
USPC .......... 252/182.1, 506; 429/149, 224, 231.95, 429/217, 128
See application file for complete search history.

(56) References Cited

U.S. PATENT DOCUMENTS

| | | | | |
|---|---|---|---|---|
| 6,680,143 | B2* | 1/2004 | Thackeray et al. | 429/224 |
| 7,303,840 | B2* | 12/2007 | Thackeray et al. | 429/231.95 |
| 2006/0183024 | A1* | 8/2006 | Suzuki | 429/231.95 |
| 2008/0286653 | A1* | 11/2008 | Sano et al. | 429/217 |
| 2011/0111294 | A1* | 5/2011 | Lopez et al. | 429/217 |

FOREIGN PATENT DOCUMENTS

KR    10-1990-0049248 A    7/1999

* cited by examiner

*Primary Examiner* — Khanh Tuan Nguyen
(74) *Attorney, Agent, or Firm* — Birch, Stewart, Kolasch & Birch, L.L.P.

(57) ABSTRACT

Provided are a mixed cathode active material including lithium manganese oxide expressed as Chemical Formula 1 and a stoichiometric spinel structure $Li_4Mn_5O_{12}$ having a plateau voltage profile in a range of 2.5 V to 3.3 V, and a lithium secondary battery including the mixed cathode active material. The mixed cathode material and the lithium secondary battery including the same may have improved safety and simultaneously, power may be maintained more than a required value by allowing $Li_4Mn_5O_{12}$ to complement low power in a low state of charge (SOC) range. Therefore, a mixed cathode active material able to widen an available SOC range and a lithium secondary battery including the mixed cathode active material may be provided and properly used in a plug-in hybrid electric vehicle (PHEV) or electric vehicle (EV).

14 Claims, 1 Drawing Sheet

MIXED CATHODE ACTIVE MATERIAL HAVING IMPROVED POWER CHARACTERISTICS AND LITHIUM SECONDARY BATTERY INCLUDING THE SAME

CROSS-REFERENCE TO RELATED APPLICATIONS

This application is a continuation of International Application No. PCT/KR2012/000969 filed on Feb. 9, 2012, which claims priority from Korean Patent Application No. 10-2011-0011448 filed in Republic of Korea on Feb. 9, 2011, the entire contents of which are incorporated herein by reference.

BACKGROUND OF THE INVENTION

The present invention disclosed herein relates to a mixed cathode active material able to complement a power decrease phenomenon and a lithium secondary battery including the same, and more particularly, to a mixed cathode active material for a lithium secondary battery having excellent effects by being used in a series-type plug-in hybrid electric vehicle (PHEV) or electric vehicle (EV) and a lithium secondary battery including the mixed cathode active material.

Recently, lithium secondary batteries have been used in various fields including portable electronic devices such as mobile phones, personal digital assistants (PDAs), and laptop computers. In particular, in line with growing concerns about environmental issues, research into lithium secondary batteries having high energy density and discharge voltage as a power source of an electric vehicle able to replace vehicles using fossil fuels such as gasoline vehicle and diesel vehicle, one of major causes of air pollution, have been actively conducted and some of the research are in a commercialization stage. Meanwhile, in order to use a lithium secondary battery as a power source of the electric vehicle, the lithium secondary battery must maintain stable power in a usable state of charge (SOC) range along with high power.

An electric vehicle is classified as a typical electric vehicle (EV), battery electric vehicle (BEV), hybrid electric vehicle (HEV), or plug-in hybrid electric vehicle (PHEV) according to a power source thereof.

The HEV among the foregoing electric vehicles is a vehicle obtaining a driving force from the combination of typical internal combustion engine (engine) and electric battery, and has a mode, in which the driving force is mainly obtained through the engine while the battery assists insufficient power of the engine only in the case of requiring more power than that of a typical case, such as uphill driving, and SOC is recovered again through charging the battery during stop of the vehicle. That is, the engine is a primary power source in the HEV, and the battery is an auxiliary power source and is only used intermittently.

The PHEV is a vehicle obtaining a driving force from the combination of engine and battery rechargeable by being connected to an external power supply, and is broadly classified as parallel-type PHEV and series-type PHEV.

In the parallel-type PHEV, the engine and the battery are in an equivalent relationship to each other as a power source and the engine or the battery may alternatingly act as a primary power source according to the situation. That is, the parallel-type PHEV is operated in a mutually parallel mode, in which the battery makes up for insufficient power of the engine when the engine becomes a primary power source and the engine makes up for insufficient power of the battery when the battery becomes a primary power source.

However, the series-type PHEV is a vehicle basically driven only by a battery, in which an engine only acts to charge the battery. Therefore, since the series-type PHEV entirely depends on the battery rather than the engine in terms of driving of the vehicle, differing from the HEV or the parallel-type PHEV, maintaining of stable power according to battery characteristics in a usable SOC range becomes a very important factor for driving safety in comparison to other types of electric vehicles, and the same also applies to the EV.

Meanwhile, with respect to $LiCoO_2$, a typical cathode material of a high-capacity lithium secondary battery, practical limits of an increase in energy density and power characteristics have been reached. In particular, when $LiCoO_2$ is used in high energy density applications, oxygen in a structure of $LiCoO_2$ is discharged along with structural degeneration in a high-temperature charged state due to its structural instability to generate an exothermic reaction with an electrolyte in a battery and thus it becomes a main cause of battery explosion. In order to improve the safety limitation of $LiCoO_2$, uses of lithium-containing manganese oxides, such as layered crystal structure $LiMnO_2$ and spinel crystal structure $LiMn_2O_4$, and lithium-containing nickel oxide ($LiNiO_2$) have been considered, and a great deal of research into lithium manganese oxides (hereinafter, referred to as "Mn-rich") expressed as the following Chemical Formula 1, in which Mn as an essential transition metal is added in an amount larger than those of other transition metals (excluding lithium) to layered structure lithium manganese oxide as a high-capacity material, has recently been conducted.

$$xLi_2MnO_3 \cdot (1-x)LiMO_2 \qquad \text{[Chemical Formula 1]}$$

where $0<x<1$ and M is any one element or two or more elements selected from the group consisting of aluminum (Al), magnesium (Mg), manganese (Mn), nickel (Ni), cobalt (Co), chromium (Cr), vanadium (V), and iron (Fe).

The Mn-rich has high power in a high SOC range (50% or more SOC), but the power thereof may rapidly decrease according to an increase in resistance in a low SOC range, and thus use of the Mn-rich as a cathode material of a lithium secondary battery used in the series-type PHEV or EV may be limited.

The foregoing limitations may also be generated in the case of mixing a cathode active material having an operating voltage higher than that of the Mn-rich, and the reason for this is that the Mn-rich only acts in a low SOC range.

Such limitations must be major obstacles in using the high-capacity Mn-rich in a field, in which power characteristics are regarded as particularly important, such as an electric vehicle. In particular, differing from the HEV in which an engine is a primary power source and the parallel-type PHEV in which engine and battery act as an equivalent power source, with respect to the series-type PHEV or EV that entirely depends on a battery for driving of a vehicle, the battery may be only used in a SOC range in which more than required power is maintained. When the Mn-rich is used as a cathode active material alone, power in a low SOC range decreases such that an available SOC range becomes very narrow.

Therefore, there is an urgent need for development of a cathode material, which may widen an available SOC range through maintaining power of the Mn-rich in a low SOC range and ensure a predetermined power more than the required power of the PHEV or EV.

SUMMARY OF THE INVENTION

The inventors of the present invention, after conducting in-depth research and various experimentations, developed a mixed cathode active material able to maintain more than a predetermined level of power over an entire state of charge (SOC) range without a rapid decrease in power during charge and discharge.

Also, differing from a hybrid electric vehicle (HEV) or a parallel-type plug-in hybrid electric vehicle (PHEV), when the mixed cathode active material is particularly restrictively used in a series-type PHEV or electric vehicle (EV) that entirely depends only on a battery as a power source for driving of a vehicle, it was confirmed that an available SOC range may be extended because a level of power higher than a required value may be maintained even in a low SOC range as well as having high power in a high SOC range.

The present invention provides a mixed cathode active material able to maintain more than a predetermined level of power over an entire state of charge (SOC) range without a rapid decrease in power during charge and discharge.

The present invention also provides a lithium secondary battery including the foregoing mixed cathode active material.

The present invention also provides the lithium secondary battery used in a series-type PHEV or EV.

Embodiments of the present invention provide mixed cathode active materials including: lithium manganese oxide (Mn-rich) expressed as the following Chemical Formula 1; and a second cathode active material expressed as the following Chemical Formula 2 having a plateau voltage profile in a range of 2.5 V to 3.3 V, $$xLi_2MnO_3 \cdot (1-x)LiMO_2 \quad \text{[Chemical Formula 1]}$$

where $0<x<1$ and M is any one element or two or more elements selected from the group consisting of aluminum (Al), magnesium (Mg), manganese (Mn), nickel (Ni), cobalt (Co), chromium (Cr), vanadium (V), and iron (Fe)

$$Li_4Mn_5O_{12}. \quad \text{[Chemical Formula 2]}$$

In some embodiments, the second cathode active material may be included in an amount range of 10 to 30 parts by weight based on 100 parts by weight of the mixed cathode active material.

In other embodiments, the mixed cathode active material may further include a conductive material in addition to the lithium manganese oxide and the second cathode active material.

In still other embodiments, the conductive material may be formed of graphite and conductive carbon.

In even other embodiments, the conductive material may be included in an amount range of 0.5 to 15 parts by weight based on 100 parts by weight of the mixed cathode active material.

In yet other embodiments, the conductive carbon may be a mixture of one or more selected from the group consisting of carbon black including carbon black, acetylene black, Ketjen black, channel black, furnace black, lamp black, or thermal black, or a material having a crystal structure of graphene or graphite.

In further embodiments, the mixed cathode active material may further include one or more lithium-containing metal oxides selected from the group consisting of lithium cobalt oxide, lithium nickel oxide, lithium manganese oxide, lithium cobalt-nickel oxide, lithium cobalt-manganese oxide, lithium manganese-nickel oxide, lithium cobalt-nickel-manganese oxide, and oxides having other elements substituted or doped therein.

In still further embodiments, the other elements may be one or more selected from the group consisting of aluminum (Al), magnesium (Mg), nickel (Ni), cobalt (Co), iron (Fe), chromium (Cr), vanadium (V), titanium (Ti), copper (Cu), boron (B), calcium (Ca), zinc (Zn), zirconium (Zr), niobium (Nb), molybdenum (Mo), strontium (Sr), antimony (Sb), tungsten (W), and bismuth (Bi).

In even further embodiments, the lithium-containing metal oxide may be included in an amount of 50 parts by weight or less based on 100 parts by weight of the mixed cathode active material.

In other embodiments of the present invention, cathodes include the mixed cathode active material.

In still other embodiments of the present invention, lithium secondary batteries include the cathode.

In yet further embodiments, power of the lithium secondary battery in a state of charge (SOC) range of 20% to 40% may be 20% or more of power at 50% SOC.

In much further embodiments, the lithium secondary battery is used in a series-type plug-in hybrid electric vehicle (PHEV).

In still much further embodiments, the lithium secondary battery is used in an electric vehicle (EV).

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF THE EMBODIMENTS

Figure 1:
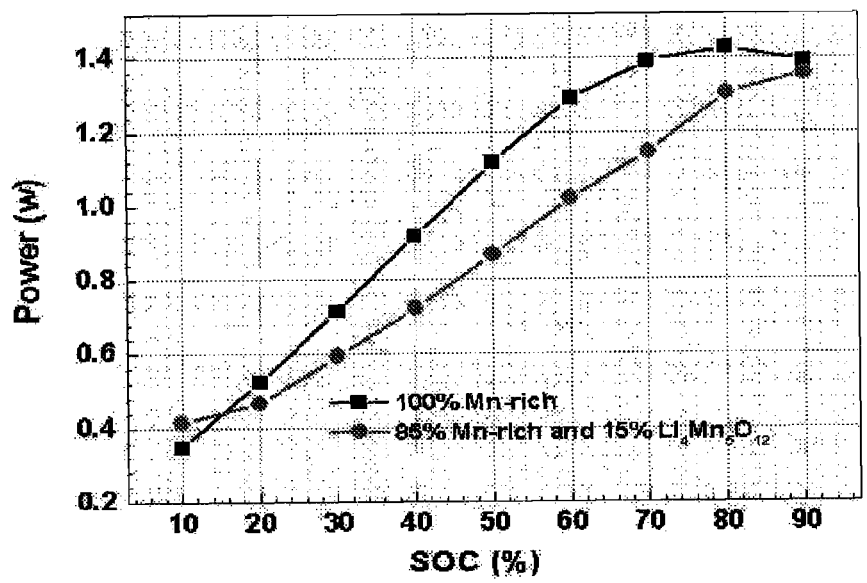
FIG. 1 is a graph showing powers according to each state of charge (SOC) of lithium secondary batteries according to Example and Comparative Example of the present invention.
Figure 2:
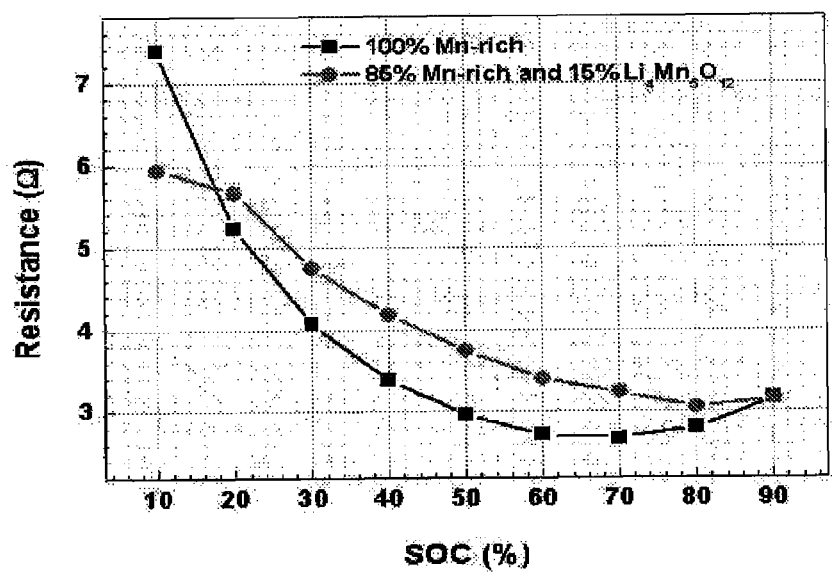
FIG. 2 is a graph showing resistances according to each SOC of lithium secondary batteries according to Example and Comparative Example of the present invention.

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Hereinafter, the present invention will be described in more detail.

The present invention relates to a mixed cathode active material for a lithium secondary battery including a mixed cathode material, in which layered structure lithium manganese oxide (Mn-rich) expressed as the following Chemical Formula 1 is mixed with a second cathode active material having a plateau voltage range lower than that of the Mn-rich.

$$xLi_2MnO_3 \cdot (1-x)LiMO_2 \quad \text{[Chemical Formula 1]}$$

where $0<x<1$ and M is any one element or two or more elements selected from the group consisting of aluminum (Al), magnesium (Mg), manganese (Mn), nickel (Ni), cobalt (Co), chromium (Cr), vanadium (V), and iron (Fe).

The layered structure lithium manganese oxide (Mn-rich) expressed as the above Chemical Formula 1 includes Mn as an essential transition metal, has a content of Mn greater than those of other metals excluding lithium, and is a type of lithium transition metal oxides exhibiting large capacity during overcharging at high voltage. Meanwhile, the Mn-rich may provide lithium ions consumed in an initial irreversible reaction on a surface of an anode and thereafter, may also provide an additional lithium source by allowing lithium ions not used in the irreversible reaction at the anode to move to a cathode during discharge.

Since Mn included as an essential transition metal in the layered structure lithium manganese oxide is included in an amount greater than those of other metals (excluding lithium), a content of Mn may be included in a range of 50 mol % to 80 mol % based on a total amount of metals excluding lithium.

When the content of Mn is too low, safety may decrease, manufacturing costs may increase, and unique properties of the Mn-rich may not be obtained. On the other hand, when the content of Mn is too high, cycle stability may decrease.

Also, the Mn-rich has a predetermined range of plateau potential above oxidation/reduction voltage appearing by changes in oxidation numbers of components in a cathode active material. Specifically, a plateau potential range may be obtained at about 4.5 V to 4.8 V during overcharging at a high voltage of 4.5 V or more based on cathode voltage.

However, the Mn-rich has high power in a high SOC range, but power may rapidly decrease in a low SOC range due to an increase in resistance. Therefore, there are limitations in using the Mn-rich as a cathode material of a lithium secondary battery for a series-type PHEV or EV. Such phenomenon may also occur in the case that a cathode active material having a higher operating voltage than that of the Mn-rich is mixed, and the reason for this is that only the Mn-rich may operate alone in a low SOC range.

Therefore, the present invention may include a mixed cathode material in which the Mn-rich and a material having a somewhat lower operating voltage as a second cathode active material are mixed.

The second cathode active material is mixed for the purpose of assisting a power decrease in a low SOC range of the Mn-rich and is required to have plateau potential at a voltage lower than that at an operating voltage limit of the Mn-rich.

The second cathode active material may have a plateau voltage profile in a range of 2.5 V to 3.3 V and for example, may have a plateau voltage profile in a range of 2.8 V to 3.3 V.

As a result, the second cathode active material in addition to the Mn-rich is involved in insertion and elimination processes of lithium (Li) in a low SOC range of the Mn-rich, a range of 2.5 V to 3.3 V, and thus a lithium secondary battery may be provided, in which an available SOC range becomes very wide by allowing the second cathode active material to complement low power of the Mn-rich within the foregoing voltage range.

When the second cathode active material is mixed with the Mn-rich, power in a high SOC range may be somewhat lower than that of the case of a cathode active material using the Mn-rich alone, due to a composition ratio of the Mn-rich decreased as much as a fraction of the included second cathode active material. However, with respect to a lithium secondary battery used in a series-type PHEV or EV, a lithium secondary battery able to maintain power of 2.5 V or more in an as wide SOC range as possible is required rather than a secondary battery exhibiting high capacity in a limited range of specific voltage. Therefore, a mixed cathode material according to the present invention and a lithium secondary battery including the same may be appropriate for operating devices, such as the series-type PHEV or EV, required to maintain a state above a predetermined power without a rapid decrease in power over an entire SOC range.

As described above, the second cathode active material is required to be lithium transition metal oxide having a plateau voltage profile in a range of 2.5 V to 3.3 V, for example, 2.8 V to 3.2 V, and may be required to be lithium transition metal oxide expressed as the following Chemical Formula 2.

$$Li_4Mn_5O_{12} \qquad \text{[Chemical Formula 2]}$$

A lithium manganese oxide of Chemical Formula 2, i.e., $Li_4Mn_5O_{12}$ is lithium manganese oxide having a cubic-symmetry structure, is stoichiometric spinel like a cation-ordered structure $Li[Li_{0.33}Mn_{1.67}]O_4$, and has a relatively high capacity, i.e., a theoretical capacity of 163 mAh/g. When $Li_4Mn_5O_{12}$ is used as an electrode active material of the following lithium secondary battery, the following electrochemical reaction occurs during charge and discharge.

$$Li_{4+x}Mn_5O_{12} \underset{\text{Discharge}}{\overset{\text{Charge}}{\rightleftarrows}} Li_4Mn_5O_{12} + xLi^+ + xe^- (0 \le x \ge 3)$$

At this time, in $Li_{4+x}Mn_5O_{12}$, a Jahn-Teller distortion phenomenon only occurs in the composition of $Li_{6.5}Mn_5O_{12}$ when x is 2.5, and a Jahn-Teller distortion effect of $Li_7Mn_5O_{12}$ when x=3, i.e., a state of rock salt completely charged with lithium, is weaker than that of $Li_2Mn_2O_4$.

$Li_{4+x}Mn_5O_{12}$ able to maintain cubic symmetry of an electrode in a range of 3 V to 4V may have an effect of enabling various spinel compositions to be selected.

Also, a cathode active material according to the present invention may be a cathode active material in which lithium manganese oxide of the following Chemical Formula 1 and $Li_4Mn_5O_{12}$ are mixed.

$$xLi_2MnO_3 \cdot (1-x)LiMO_2 \qquad \text{[Chemical Formula 1]}$$

where 0<x<1 and M is any one element or two or more elements selected from the group consisting of aluminum (Al), magnesium (Mg), manganese (Mn), nickel (Ni), cobalt (Co), chromium (Cr), vanadium (V), and iron (Fe).

Manifestation of desirable cycle characteristics and capacity may be expected in a secondary battery including the foregoing mixed cathode active material.

The mixed cathode active material according to the present invention may be appropriate for an operating device which must maintain a state above a predetermined power without a rapid decrease in power over an entire SOC range. For particular example, desirable effects may be obtained when the mixed cathode active material is used in a series-type PHEV or EV.

As described above, since the series-type PHEV is an electric vehicle operated with only a battery, differing from a HEV in which an engine is a primary power source and a parallel-type PHEV in which engine and battery operate in an equivalent relationship to each other as a power source, the battery may be only used in a SOC range, in which more than the power required for driving is maintained, due to the characteristics thereof, and the EV also requires a secondary battery having a wide available SOC range.

Therefore, with respect to the mixed cathode active material according to the present invention and the lithium secondary battery including the same, desirable effects may be obtained when used in a parallel-type PHEV or EV.

A method of forming a mixed cathode active material by mixing the lithium manganese oxide (Mn-rich) of the above Chemical Formula 1 and the second cathode active material is not significantly limited, and various methods known in the art may be used.

Also, the second cathode active material may be included in an amount range of 10 to 30 parts by weight based on 100 parts by weight of the mixed cathode material and for example, may be included in an amount range of 10 to 20 parts by weight. When a content of the second cathode active material is greater than 30 parts by weight, a high energy lithium secondary battery may not be obtained. When the content of the second cathode active material is less than 10 parts by weight, objectives of power assistance in a low SOC range and a safety improvement aimed in the present invention may not be achieved because the content of the second cathode active material is too low.

Further, when the mixed cathode material including the Mn-rich and the second cathode active material is formed, there is a need for considering limitations which may occur according to particle sizes or specific surface areas of both materials.

Specifically, difference between the particle sizes or specific surface areas of two or more of the cathode active materials used in the present invention may be limited within a predetermined range or a proper conduction system may be used by considering the foregoing. A conductive material may be uniformly distributed without being concentrated any one cathode active material by uniformization of the particle size and thus electrical conductivity of the mixed cathode material may be further improved.

Therefore, in the present invention, an appropriate treatment may be performed on the Mn-rich and the second cathode active material so as to allow the particle sizes of both materials to be similar, and according to a preferred embodiment of the present invention, any one cathode active material having a smaller particle size may be sintered to form secondary particles by agglomeration in order to make their particle sizes uniform with respect to the particle size of the other cathode active material having a relatively larger particle size.

At this time, the method of sintering and forming secondary particles may not be particularly limited and the methods known in the art may be used.

Since particle sizes or shapes of the mixed two or more cathode active materials may be made to be as uniform as possible, a phenomenon may be prevented, in which a conductive material coating the mixed cathode material is concentrated on any one cathode active material having a larger specific surface area and as a result, conductivity of other cathode active material having the relatively less conductive material greatly decreases. Therefore, conductivity of the mixed cathode material may be greatly improved.

In order to reduce difference between the particle sizes or specific surface areas of two or more of the cathode active materials to be mixed, a method of forming a cathode active material having a relatively smaller particle size into large secondary particles, a method of forming a cathode active material having a relatively larger particle size into small particles, or a method of simultaneously using the foregoing two methods may be used.

The mixed cathode material may include two or more conductive materials having different particle sizes or shapes. A method of including the conductive material is not significantly limited and a typical method known in the art, such as coating of the cathode active material, may be used. As described above, this is for preventing a phenomenon in which the conductive material is concentrated on any one of the cathode active materials due to the particle size difference between the cathode active materials to be mixed. In a preferred embodiment of the present invention, graphite and conductive carbon may be simultaneously used as the conductive material.

The mixed cathode material may be simultaneously coated with graphite and conductive carbon having different particle sizes and shapes as the conductive material, and thus a decrease in conductivity or low power of the entire cathode active material due to the difference between particle sizes or surface areas of the Mn-rich and the second cathode active material may be more effectively improved. At the same time, a high-capacity mixed cathode active material having a wide available SOC range may be provided.

The mixed cathode active material may further include one or more lithium-containing metal oxides selected from the group consisting of lithium cobalt oxide, lithium nickel oxide, lithium manganese oxide, lithium cobalt-nickel oxide, lithium cobalt-manganese oxide, lithium manganese-nickel oxide, lithium cobalt-nickel-manganese oxide, and oxides having other elements substituted or doped therein. The other elements may be one or more selected from the group consisting of aluminum (Al), magnesium (Mg), nickel (Ni), cobalt (Co), iron (Fe), chromium (Cr), vanadium (V), titanium (Ti), copper (Cu), boron (B), calcium (Ca), zinc (Zn), zirconium (Zr), niobium (Nb), molybdenum (Mo), strontium (Sr), antimony (Sb), tungsten (W), and bismuth (Bi).

At this time, the lithium-containing metal oxide may be included in an amount of 50 parts by weight or less based on 100 parts by weight of the mixed cathode material.

The graphite and conductive carbon are not particularly limited so long as they have excellent electrical conductivity and do not cause a side reaction in the inner environment of the lithium secondary battery or chemical changes in the present battery as well as having electrical conductivity.

Specifically, nature graphite or artificial graphite may be used without limitation as the graphite. A carbon-based material having high electrical conductivity may be particularly used as the conductive carbon, and specifically, a mixture of one or more materials selected from the group consisting of carbon black, such as carbon black, acetylene black, Ketjen black, channel black, furnace black, lamp black, or thermal black, or a material having a crystal structure of graphene or graphite may used as the conductive carbon. In some cases, a conductive polymer having high electrical conductivity may be used.

Herein, the conductive material formed of the graphite and the conductive carbon may be included in an amount range of 0.5 to 15 parts by weight based on 100 parts by weight of the mixed cathode material. When a content of the conductive material is too low, as less than 0.5 parts by weight, the foregoing effects may not be expected, and when the content of the conductive material is too high, as greater than 15 parts by weight, high capacity or high energy density may not be obtained due to a relatively less amount of the cathode active material.

At this time, a content of the conductive carbon may be included in an amount range of 1 to 13 parts by weight based on 100 parts by weight of the cathode material and for example, may be included in an amount range of 3 to 10 parts by weight.

The present invention relates to a cathode of a lithium secondary battery having a current collector coated with the mixed cathode material, and a lithium secondary battery including the foregoing cathode.

In general, a lithium secondary battery is composed of a cathode including a cathode material and a current collector, an anode including an anode material and a current collector, and a separator blocking electronic conduction between the cathode and the anode and able to conduct lithium ions, and an electrolyte for conduction of lithium ions is included in voids of electrode and separator materials.

The cathode and the anode are generally prepared by coating the current collectors with a mixture of electrode active material, conductive material, and binder, and then drying the coated collectors. A filler may be further added to the mixture as needed.

The lithium secondary battery of the present invention may be prepared according to a typical method known in the art.

Specifically, the lithium secondary battery may be prepared by inserting a porous separator between the cathode and the anode and introducing a non-aqueous electrolyte.

Power variation in a specific SOC range may be limited in a predetermined range in order to maintain stable power in a low SOC range and improve safety.

In a preferred embodiment of the present invention, power of the lithium secondary battery in a SOC range of 10% to 40% may be 20% or more of power at 50% SOC and for example, may be 50% or more of the power at 50% SOC. The mixed cathode material, the cathode, and the lithium secondary battery according to the present invention may be appropriate for an operating device which must maintain a state above a predetermined power without a rapid decrease in power over an entire SOC range. The second cathode active material complements low power characteristics due to a rapid increase in resistance of the Mn-rich in a low SOC range such that more than the required power is maintained even in a low SOC range (10 to 40% SOC), and thus an available SOC range may become wide and at the same time, safety may improve.

Hereinafter, the present invention will be described in more detail according to specific examples.

Example

Preparation of Cathode

A slurry was prepared by adding 90 wt % of a mixture composed of $0.5Li_2MnO_3 \cdot 0.5LiMn_{1/3}Ni_{1/3}Co_{1/3}O_2$ (Mn-rich, 85 wt %) and $Li_4Mn_5O_{12}$ (15 wt %) as a cathode active material, 6 wt % of Denka black as a conductive material, and 4 wt % of polyvinylidene fluoride (PVDF) as a binder to N-methyl-pyrrolidone (NMP). An aluminum (Al) foil as a cathode current collector was coated with the slurry, and then the coated Al foil was rolled and dried to prepare a cathode for a lithium secondary battery.

Preparation of Lithium Secondary Battery

A porous polyethylene separator was disposed between the cathode thus prepared and a graphite-based anode, and a lithium electrolyte was introduced to prepare a polymer-type lithium secondary battery. The polymer-type lithium secondary battery was initially charged at 4.6 V, and then power was measured according to SOC during charge and discharge between 2.0 V and 4.5 V (C-rate=1 C).

Comparative Example

A polymer-type lithium secondary battery was prepared in the same manner as Example except that $0.5Li_2MnO_3 \cdot 0.5LiMn_{1/3}Ni_{1/3}Co_{1/3}O_2$ (Mn-rich) is only used as a cathode active material.

Experimental Example

With respect to full cell lithium secondary batteries prepared according to Example and Comparative Example, power variations according to SOC in a voltage range of 2.0 V to 4.5 V were measured and the results thereof are presented in FIG. 1.

Referring to FIG. 1, with respect to Example (85% Mn-rich and 15% $Li_4Mn_5O_{12}$), power in a high SOC range was somewhat lower than that of Comparative Example, but power in a low SOC range (a SOC range of about 10 to 50% in graphs) was almost not decreased and stably maintained. Therefore, it may be understood that an available SOC range was considerably wide. On the other hand, with respect to Comparative Example (100% Mn-rich), power in a high SOC range was somewhat higher than that of Example, but power in a low SOC range (a SOC range of about 10 to 50% in graphs) was rapidly decreased and thus it may be understood that an available SOC range became narrow. (Since the data shown in FIG. 1 were only an example and detailed power values according to SOC may vary according to specifications of a cell, tendencies of the graphs may be important rather than the detailed values.)

With respect to the lithium secondary battery according to the present invention, a second cathode active material such as $Li_4Mn_5O_{12}$ was mixed with lithium manganese oxide of Chemical Formula 1 having high capacity to complement low power of lithium manganese oxide of Chemical Formula 1 in a low SOC range and thus more than the required power may be maintained in a wide SOC range. Therefore, it was confirmed that a lithium secondary battery having a wide available SOC range and improved safety may be provided.

A mixed cathode active material according to the present invention includes a mixture of high-capacity lithium manganese oxide and a second cathode active material having a lower operating voltage to allow the second cathode active material to complement a decrease in power due to a rapid increase in resistance of the lithium manganese oxide in a low SOC range as well as safety of a cell being improved, and thus the mixed cathode active material may provide a high-capacity lithium secondary battery having a wide available SOC range by maintaining power more than a required value even in a low SOC range during discharge.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A mixed cathode active material comprising:
   lithium manganese oxide expressed as Chemical Formula 1; and
   a second cathode active material expressed as Chemical Formula 2 having a plateau voltage profile in a range of about 2.5 V to about 3.3 V:

$$xLi_2MnO_3 \cdot (1-x)LiMO_2 \quad \text{[Chemical Formula 1]}$$

where 0<x<1 and M is any one element or two or more elements selected from the group consisting of Al (aluminum), Mg (magnesium), Mn (manganese), Ni (nickel), Co (cobalt), Cr (chromium), V (vanadium), and Fe (iron)

$$Li_4Mn_5O_{12}. \quad \text{[Chemical Formula 2]}$$

2. The mixed cathode active material of claim 1, wherein the second cathode active material is included in an amount range of about 10 to about 30 parts by weight based on 100 parts by weight of the mixed cathode active material.

3. The mixed cathode active material of claim 1, wherein the mixed cathode active material further comprises a conductive material in addition to the lithium manganese oxide and the second cathode active material.

4. The mixed cathode active material of claim 3, wherein the conductive material is formed of graphite and conductive carbon.

5. The mixed cathode active material of claim 4, wherein the conductive carbon is a mixture of one or more selected from the group consisting of carbon black, acetylene black, Ketien black, channel black, furnace black, lamp black, or thermal black, and a material having a crystal structure of graphene or graphite.

6. The mixed cathode active material of claim 3, wherein the conductive material is included in an amount range of about 0.5 to about 15 parts by weight based on 100 parts by weight of the mixed cathode active material.

7. The mixed cathode active material of claim 1, wherein the mixed cathode active material further comprises one or more lithium-containing metal oxides selected from the group consisting of lithium cobalt oxide, lithium nickel oxide, lithium manganese oxide, lithium cobalt-nickel oxide, lithium cobalt-manganese oxide, lithium manganese-nickel oxide, lithium cobalt-nickel-manganese oxide, and oxides having other elements substituted or doped therein.

8. The mixed cathode active material of claim 7, wherein the other elements are one or more selected from the group consisting of Al (aluminum), Mg (magnesium), Ni (nickel), Co (cobalt), Fe (iron), Cr (chromium), V (vanadium), Ti (titanium), Cu (copper), B (boron), Ca (calcium), Zn (zinc), Zr (zirconium), Nb (niobium), Mo (molybdenum), Sr (strontium), Sb (antimony), W (tungsten), and Bi (bismuth).

9. The mixed cathode active material of claim 7, wherein the lithium-containing metal oxide further added to the mixed cathode active material comprising the compounds of chemical formulas 1 and 2 is included in an amount of about 50 parts by weight or less based on 100 parts by weight of the mixed cathode active material.

10. A cathode comprising the mixed cathode active material of claim 1.

11. A lithium secondary battery comprising the cathode of claim 10.

12. The lithium secondary battery of claim 11, wherein power of the lithium secondary battery in a SOC (state of charge) range of about 20% to about 40% is about 20% or more of power at about 50% SOC.

13. The lithium secondary battery of claim 11, wherein the lithium secondary battery is suitable for use in a series-type PHEV (plug-in hybrid electric vehicle).

14. The lithium secondary battery of claim 11, wherein the lithium secondary battery is suitable for use in an EV (electric vehicle).

* * * * *